United States Patent Office 3,081,328
Patented Mar. 12, 1963

3,081,328
FLUOROPHENYLMERCAPTOMETHYL ESTERS OF PENTAVALENT THIOPHOSPHORUS ACIDS
Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed Nov. 4, 1959, Ser. No. 850,768
Claims priority, application Germany Nov. 18, 1958
8 Claims. (Cl. 260—461)

The present invention relates to and has as its objects new and useful insecticidal phosphorus containing derivatives of fluorophenyl-thiomethyl ether, and processes for their production. Generally the new compounds according to this invention may be illustrated by the following formula

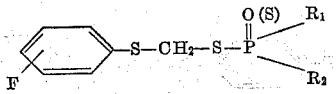

wherein $R_1$ stands for an alkyl, alkenyl, aryl, alkoxy or amino group and $R_2$ stands for an alkyl or amino group.

Some fluorophenyl - mercaptomethyl-dithiophosphoric acid esters are already known from British patent specification No. 772,213. According to the data of the aforesaid British specification these compounds possess good insecticidal properties.

The object of the present invention is a class of esters of a constitution similar to that of the compounds described in the above mentioned British specification and deriving from amino-thiolphosphoric acids, amino-dithiophosphoric acids, thiolphosphonic acids, dithiophosphonic acids, thiolphosphinic acids or dithiophosphinic acids, i.e. those compounds of the above shown formula in which no more than one of the groups $R_1$ and $R_2$ can be an alkoxy group.

More specifically said the compounds of the present invention can be such compounds of the above shown formula in which the alkyl group is a lower alkyl or alkenyl group such as methyl, ethyl, propyl, butyl, amyl, hexyl, cyclohexyl, propanyl, butenyl, pentanyl, octanyl group and the like. If $R_1$ is an aryl group, this group especially may be a phenyl group or a substituted phenyl group substituted by such groups as a chlorine atom, a bromine atom, a methyl group, an ethyl group, a nitro group, an alkoxy group, an alkylmercapto group and the like. $R_1$ if an alkoxy group preferably is a lower alkoxy group containing up to 4 carbon atoms in the alkyl radical, if an amino group this group also may be substituted by 1 or 2 lower alkyl radicals such as methyl, ethyl, propyl, or butyl groups, or the amino group may be the radical of a cyclic amine such as pyrrolidine, piperidine, piperazine, morpholine and the like. Also $R_2$ may stand for the same alkyl or amino groups as defined above. The fluoro atom in the benzene nucleus may stand in either o-, m- or p-position and the phenyl nucleus additionally may contain substituents such as those mentioned above in case of $R_1$ being aryl.

The new compounds according to the invention are obtained in a manner known in principle by the reaction of fluoro-phenyl-mercaptomethyl halides with the corresponding salts of aminothiol or amino-dithio-phosphoric acids, thiol- or dithio-phosphonic acids or thiol- or dithiophosphinic acids. The reaction may be exemplified by the conversion of p-fluorophenyl-mercaptomethyl chloride with the potassium salt of dimethyl-dithiophosphinic acid:

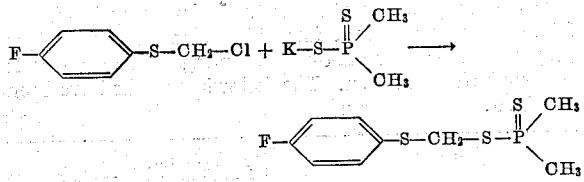

The new compounds are excellent pest control agents which are distinguished by an insecticidal and acaricidal action. The new compounds are applied in a manner known in principle, namely in combination with suitable solid or liquid extenders or diluents. Solid extenders are talc, chalk, bentonite, kieselguhr or the like, and the preferred liquid diluent is water. If the compounds are not water-soluble, the use of a solvent or a suitable commercial emulsifier is advisable or necessary.

As an example for the special utility of the inventive compounds the compounds of the following formulae

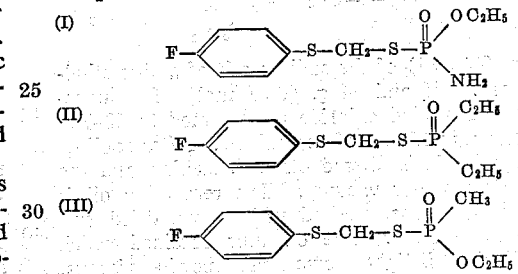

have been tested against spider mites and aphids (in case of compounds I and II) and against spider mites, aphids and larvae of the type *Aedes aegypti* (in case of compounds I, II and III). Aqueous solutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentrations indicated in the following paragraphs:

The tests have been carried out as follows:

(a) *Against spider mites.*—Bean plants (*Phaseolus vulgaris*) of about 15 inches height have been sprayed drip wet with solutions prepared as indicated above. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.01 | 100 |
| (II) | 0.01 | 100 |
| (III) | 0.0001 | 60 |

(b) *Against aphids* (*Doralis fabae*). Heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (I) | 0.1 | 100 |
| (II) | 0.01 | 100 |
| (III) | 0.001 | 100 |

(c) *Against larvae of the type Aedes aegypti.*—About 20 larvae were brought into diluted aqueous emulsions prepared as described above. Counting of the dead pests occurred after 24 hours. The following results have been obtained:

| Compound | Aqueous concentration (in percent active ingredient/water) | Killing rate (in percent) |
|---|---|---|
| (III) | 0.00001 | 100 |

The following examples are given for the purpose of illustrating the invention:

*Example 1*

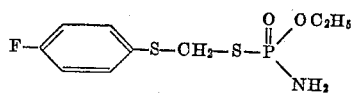

65 grams (0.4 mol) of the sodium salt of amino-ethyl-thiolphosphoric acid and 44 g. (0.25 mol) of 4-fluoro-phenyl-mercapto-methyl chloride are warmed to 60–70° C. for 2–3 hours in 150 cc. of acetonitrile. After cooling, the sodium chloride is filtered off with suction and the solvent removed under vacuum. The remaining oil is taken up with benzene, washed with water, dried and freed from the solvent. The oil thus obtained which cannot be distilled, is light brown and somewhat viscous. Yield: 65 grams corresponding to 92.6% of the theoretical.

By the same way as described above there are prepared the following compounds which showed also good insecticidal activities:

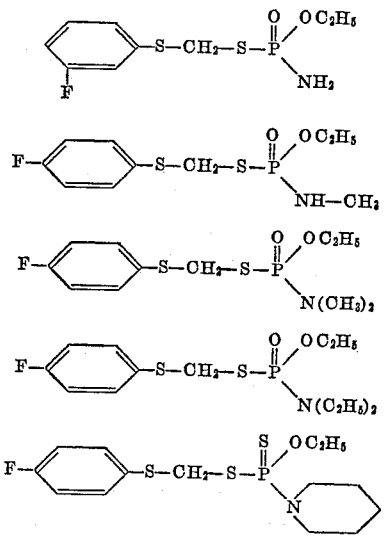

*Example 2*

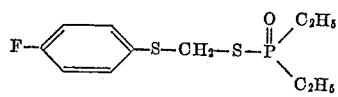

47 grams (0.3 mol) of the ammonium salt of diethyl-thiolphosphinic acid and 44 grams (0.25 mol) of 4-fluoro-phenyl-mercaptomethyl chloride in 150 cc. of n-propyl alcohol are warmed to 60–70° C. for two hours. The product is then diluted with water. The precipitated oil is taken up with benzene, washed with water and sodium bicarbonate, dried and freed from the solvent. The remaining oil distils after slight first runnings at 110° C./0.01 mm. Hg as a pale yellow oil. Yield: 40 grams corresponding to 57.5% of the theoretical.

By the same way as described above there are prepared the following compounds which showed also good insecticidal activities:

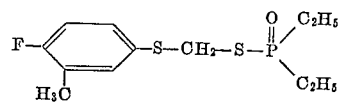

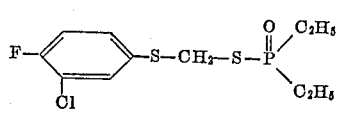

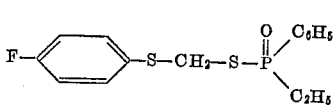

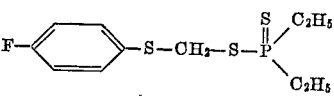

*Example 3*

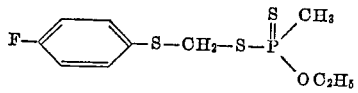

49 grams (0.3 mol) of the potassium salt of methyl-thionothiolphosphonic acid ethyl ester and 44 grams (0.25 mol) of 4-fluorophenyl-mercaptomethyl chloride in 150 cc. of acetone are stirred overnight at room temperature and warmed in the morning to 50–60° C. for an hour. After cooling, the solution is poured into water and the oil is extracted with benzene. After washing with water and sodium bicarbonate, the product is dried over sodium sulfate. The solvent is distilled off and the remaining oil distilled under high vacuum. The ester boils at 108–109° C. as a pale yellow water-insoluble oil. Yield: 65 grams corresponding to 89.2% of the theoretical. $LD_{95}$ on rats per os: 10 mg./kg.

By the same way as described above there are prepared the following compounds which showed also good insecticidal activities:

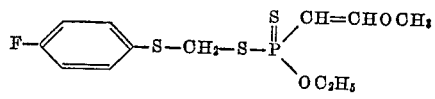

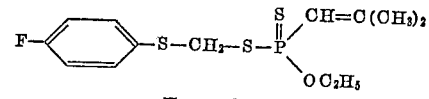

*Example 4*

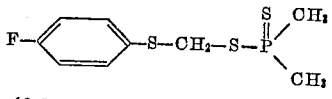

50 grams (0.3 mol) of the potassium salt of dimethyl-dithiophosphinic acid and 44 grams (0.25 mol) of 4-fluoro-phenyl-mercaptomethyl chloride are stirred in 150 cc. of acetone overnight. To complete the condensation, the product is then warmed to 50–60° C. for an hour. After working up in the manner already described, a rapidly crystallizing oil is obtained. Upon re-crystallization from benzene and petroleum ether, coarse crystals of M.P. 70–71° C. are obtained. Yield: 58 grams corresponding to 87.3% of the theoretical.

By the same way as described above there are prepared the following compounds which showed also good insecticidal activities:

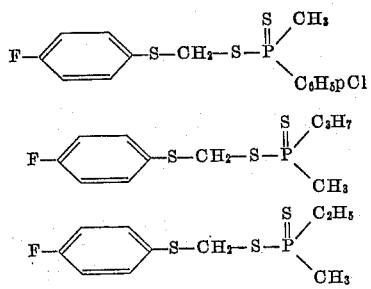

The insecticidal activities of the inventive compounds are to be seen from the following table:

| Cmpd. | Test animal | Aqueous conc., percent | Killing rate, percent | |
|---|---|---|---|---|
| Ex. 1 | Aphids | 0.1 | 100 | LD$_{95}$, 25 mg./kg. |
|  | Spider mites | 0.01 | 100 | |
|  | Syst. action | 0.1 | 100 | |
| Ex. 2 | Aphids | 0.01 | 100 | LD$_{95}$, 5 mg./kg. |
|  | Spider mites | 0.01 | 100 | |
|  | Syst. action, ovicidal action | 0.1 | 100 | |
| Ex. 3 | Cockroaches | 0.1 | 100 | LD$_{95}$, 10 mg./kg. |
|  | Mosc. larvae | 0.01 | 100 | |
|  |  | 0.00001 | 100 | |
|  | Spider mites, ovicidal action | 0.0001 | 60 | |
| Ex. 4 | Aphids | 0.001 | 100 | LD$_{95}$, 500 mg./kg. |
|  | Spider mites | 0.01 | 50 | |
|  | Ovicidal action, syst. action | 0.1 | 100 | |

We claim:

1. A compound of the following formula

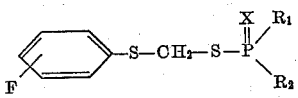

in which $R_1$ and $R_2$ stand for a member selected from the group consisting of lower alkyl and alkenyl groups up to 4 carbon atoms, phenyl groups, lower alkoxy groups up to 4 carbon atoms, amino groups and lower alkyl-substituted amino groups, only one of $R_1$ and $R_2$ being a lower alkoxy group, and X stands for a member selected from the group consisting of oxygen and sulfur.

2. A compound of the following formula

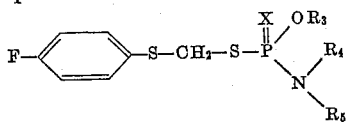

in which $R_3$ stands for a lower alkyl radical up to 4 carbon atoms, $R_4$ and $R_5$ stand for a member selected from the group consisting of hydrogen and lower alkyl radicals up to 4 carbon atoms, and X stands for a member selected from the group consisting of oxygen and sulfur.

3. A compound of the following formula

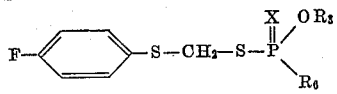

in which $R_3$ stands for a lower alkyl radical up to 4 carbon atoms, $R_6$ stands for a member selected from the group consisting of lower alkyl and alkenyl groups up to 4 carbon atoms and phenyl groups, and X stands for a member selected from the group consisting of oxygen and sulfur.

4. A compound of the following formula

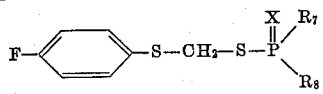

in which $R_7$ and $R_8$ stand for a member selected from the group consisting of lower alkyl and alkenyl groups up to 4 carbon atoms and phenyl groups, and X stands for a member selected from the group consisting of oxygen and sulfur.

5. The compound of the following formula

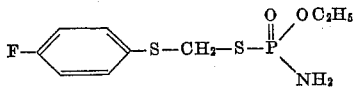

6. The compound of the following formula

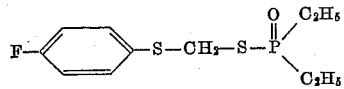

7. The compound of the following formula

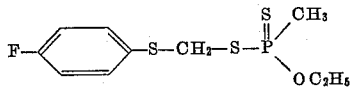

8. The compound of the following formula

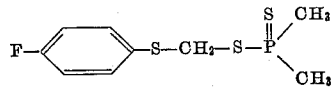

No references cited.